(12) United States Patent
Purnhagen et al.

(10) Patent No.: US 12,213,004 B2
(45) Date of Patent: *Jan. 28, 2025

(54) METHOD AND APPARATUS FOR AUDIO DECODING BASED ON DEQUANTIZATION OF QUANTIZED PARAMETERS

(71) Applicant: Dolby International AB, Dublin (IE)

(72) Inventors: Heiko Purnhagen, Sundbyberg (SE); Per Ekstrand, Saltsjobaden (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,083

(22) Filed: Nov. 6, 2023

(65) Prior Publication Data
US 2024/0155427 A1 May 9, 2024

Related U.S. Application Data

(60) Continuation of application No. 17/711,191, filed on Apr. 1, 2022, now Pat. No. 11,838,798, which is a
(Continued)

(51) Int. Cl.
*H04W 28/06* (2009.01)
*G10L 19/008* (2013.01)
(Continued)

(52) U.S. Cl.
CPC ......... *H04W 28/065* (2013.01); *G10L 19/008* (2013.01); *G10L 19/035* (2013.01);
(Continued)

(58) Field of Classification Search
CPC ............ H04W 28/065; H04W 28/0215; G10L 19/008; G10L 19/035; G10L 19/038; H04S 1/007; H04S 2420/03; H03M 7/30
See application file for complete search history.

(56) References Cited

U.S. PATENT DOCUMENTS

| 5,621,855 A | 4/1997 | Veldhuis et al. |
| 6,253,165 B1 | 6/2001 | Malvar |

(Continued)

FOREIGN PATENT DOCUMENTS

| EP | 2077551 A1 | 7/2009 |
| EP | 2261897 | 12/2010 |

(Continued)

OTHER PUBLICATIONS

Breebaart, J. et al "High-Quality Parametric Spatial Audio Coding at Low Bitrates" AES Parametric Stereo Coding, presented at the 116th Convention, Berlin, Germany, May 8-11, 2004.
(Continued)

*Primary Examiner* — Sonia L Gay

(57) ABSTRACT

The present disclosure provides methods, devices and computer program products for non-uniform quantization of parameters. The disclosure further relates to a method and apparatus for reconstructing an audio object in an audio decoding system taking the non-uniformly quantized parameters into account. According to the disclosure, such an approach renders it possible to reduce bit consumption without substantially reducing the quality of the reconstructed audio object.

7 Claims, 7 Drawing Sheets

Related U.S. Application Data continuation of application No. 16/905,920, filed on Jun. 19, 2020, now Pat. No. 11,297,533, which is a division of application No. 16/454,649, filed on Jun. 27, 2019, now Pat. No. 10,694,424, which is a division of application No. 16/101,220, filed on Aug. 10, 2018, now Pat. No. 10,383,003, which is a division of application No. 15/584,534, filed on May 2, 2017, now Pat. No. 10,057,808, which is a continuation of application No. 14/916,534, filed as application No. PCT/EP2014/069040 on Sep. 8, 2014, now Pat. No. 9,672,837.

(60) Provisional application No. 61/877,166, filed on Sep. 12, 2013.

(51) Int. Cl.
    *G10L 19/035*     (2013.01)
    *G10L 19/038*     (2013.01)
    *H03M 7/30*     (2006.01)
    *H04S 1/00*     (2006.01)
    *H04W 28/02*     (2009.01)

(52) U.S. Cl.
    CPC ......... *H04S 1/007* (2013.01); *H04W 28/0215* (2013.01); *G10L 19/038* (2013.01); *H04S 2420/03* (2013.01)

(56) References Cited

U.S. PATENT DOCUMENTS

| | | | |
|---|---|---|---|
| 7,751,572 B2 | 7/2010 | Lars | |
| 8,054,981 B2 | 11/2011 | Jonas | |
| 8,069,052 B2 | 11/2011 | Thumpudi | |
| 2005/0043830 A1 | 2/2005 | Lee | |
| 2005/0165611 A1 | 7/2005 | Mehrotra | |
| 2005/0278174 A1* | 12/2005 | Sasaki | G10L 19/032 704/229 |
| 2007/0016416 A1 | 1/2007 | Roden | |
| 2008/0319739 A1 | 12/2008 | Sanjeev | |
| 2009/0006103 A1 | 1/2009 | Koishida | |
| 2009/0326962 A1 | 12/2009 | Chen et al. | |
| 2011/0170711 A1 | 7/2011 | Rettelbach | |
| 2013/0094654 A1 | 4/2013 | Breebaart | |

FOREIGN PATENT DOCUMENTS

| | | |
|---|---|---|
| GB | 2485979 | 6/2012 |
| JP | 2005-196040 | 7/2005 |
| RU | 2376655 | 12/2009 |
| RU | 2422987 C2 | 6/2011 |
| RU | 2464649 | 10/2012 |
| WO | 03/007656 | 1/2003 |
| WO | 2006/048226 | 5/2006 |
| WO | 2006/111294 | 10/2006 |
| WO | 2009/048239 | 4/2009 |
| WO | 2010/000313 | 1/2010 |
| WO | 2010/075895 | 7/2010 |
| WO | 2010/105926 | 9/2010 |
| WO | 2011/073600 | 6/2011 |
| WO | 2012/141635 | 10/2012 |

OTHER PUBLICATIONS

Text of ISO/IEC 13818-7:2004 (MPEG-2 AAC 3rd edition)2004.

* cited by examiner

METHOD AND APPARATUS FOR AUDIO DECODING BASED ON DEQUANTIZATION OF QUANTIZED PARAMETERS

CROSS REFERENCE TO RELATED APPLICATIONS

This application is a continuation of U.S. patent application Ser. No. 17/711,191, filed on Apr. 1, 2022, which is a continuation of U.S. patent application Ser. No. 16/905,920, filed on Jun. 19, 2020, now U.S. Pat. No. 11,297,533, which is a divisional of U.S. patent application Ser. No. 16/454,649, filed Jun. 27, 2019, now U.S. Pat. No. 10,694,424, which is a divisional of U.S. patent application Ser. No. 16/101,220, filed Aug. 10, 2018, now U.S. Pat. No. 10,383,003, which is a divisional of U.S. patent application Ser. No. 15/584,534, filed May 2, 2017, now U.S. Pat. No. 10,057,808, which is a continuation of U.S. patent application Ser. No. 14/916,534, filed Mar. 3, 2016, now U.S. Pat. No. 9,672,837, which is the United States National Stage Entry of PCT/EP2014/069040, filed Sep. 8, 2014, which claim the benefit of U.S. Provisional Application No. 61/877,166, filed Sep. 12, 2013, each of which is incorporated by reference herein in its entirety.

TECHNICAL FIELD

The disclosure herein generally relates to audio coding. In particular, it relates to perceptually optimized quantization of parameters used in a system for parametric spatial coding of audio signals.

BACKGROUND

The performance of low bit audio coding systems can be significantly improved for stereo signals when a parametric stereo (PS) coding tool is employed. In such a system, a mono signal is typically quantized and conveyed using a State-of-the-Art audio coder and stereo parameters are estimated and quantized in the encoder and added as side information to the bit stream. In the decoder, the stereo signal is reconstructed from the decoded mono signal with help of stereo parameters.

There are several possible parametric stereo coding variants. Accordingly, there are several encoder types and, in addition to a mono downmix, they generate different stereo parameters that are embedded in the generated bit stream. Tools for such coding have also been standardized. An example of such a standard is MPEG-4 Audio (ISO/IEC 14496-3).

The main idea behind audio coding systems in general and parametric stereo coding in particular, and one of the several challenges of this technical field is to minimize the amount of information that has to be transferred in the bit stream from an encoder to a decoder while still obtaining a good audio quality. A high level of compression of the bit stream information may lead to unacceptable sound quality either because of complex and insufficient calculation processes or because information has been lost in the compression process. A low level of compression of the bit stream information may on the other hand lead to capacity problems which also may result in unacceptable sound quality.

Accordingly, there is a need for improved parametric stereo coding methods.

BRIEF DESCRIPTION OF THE DRAWINGS

In what follows, example embodiments will be described in greater detail and with reference to the accompanying drawings, in which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Figure 1:
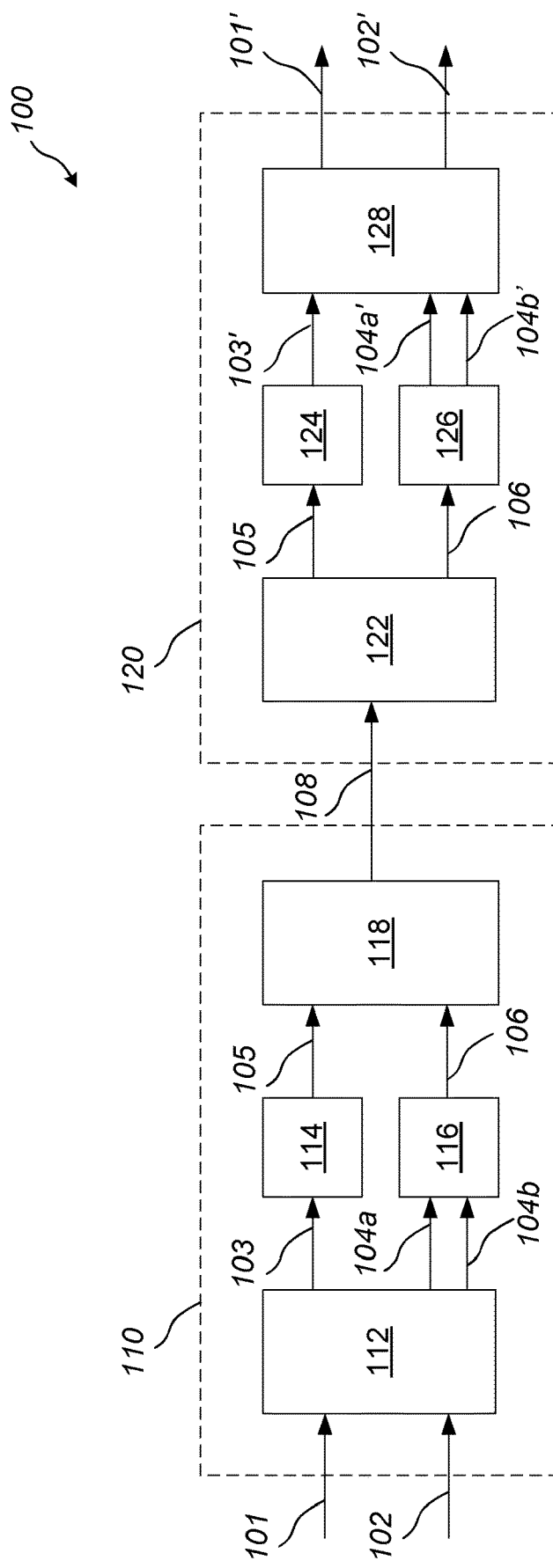
FIG. 1 discloses a block diagram of a parametric stereo encoding and decoding system in accordance with an example embodiment.

In view of the above it is an object to provide encoders, decoders, systems comprising encoders and decoders, and associated methods which provide an increased efficiency and quality of the coded audio signal.

I. Overview—Encoder

According to a first aspect, example embodiments propose encoding methods, encoders, and computer products for encoding. The proposed methods, encoders and computer program products may generally have the same features and advantages.

According to example embodiments, there is provided a method in an audio encoder for quantization of parameters relating to parametric spatial coding of audio signals, comprising: receiving at least a first parameter and a second parameter to be quantized; quantizing the first parameter based on a first scalar quantization scheme having non-uniform step-sizes to obtain a quantized first parameter, wherein the non-uniform step-sizes are selected such that smaller step-sizes are used for ranges of the first parameter where the human sound perception is most sensitive, and larger step-sizes are used for ranges of the first parameter where the human sound perception is less sensitive; dequantizing the quantized first parameter using the first scalar quantization scheme to obtain a dequantized first parameter being an approximation of the first parameter; accessing a scaling function which maps values of the dequantized first parameter on scaling factors which increase with the step-sizes corresponding to the values of the dequantized first parameter, and determining a scaling factor by subjecting the dequantized first parameter to the scaling function; and quantizing the second parameter based on the scaling factor and a second scalar quantization scheme having non-uniform step-sizes to obtain a quantized second parameter.

The method is based on the understanding that human sound perception is not homogenous. Instead, it turns out that human sound perception is higher regarding some sound characteristics and lower for other sound characteristics. This implies that human sound perception is more sensitive for some values of parameters relating to parametric spatial coding of audio signals than for other such values. According to the provided method, a first such parameter is quantized in non-uniform step-sizes such that smaller step-sizes are used where human sound perception is most sensitive and larger step-sizes are used where the human sound perception is less sensitive. By quantizing using such non-uniform step-size schemes it is possible to reduce average parametric stereo bit consumption without reducing the perceptible sound quality.

According to embodiments, the scaling function of the method is a piecewise linear function.

According to embodiments, the method step of quantizing the second parameter is based on the scaling factor and the second scalar quantization scheme comprises dividing the second parameter by the scaling factor prior to subjecting the second parameter to quantization in accordance with the second scalar quantization scheme.

According to an alternative embodiment of the method, the non-uniform step-sizes of the second scalar quantization scheme are scaled by the scaling factor prior to quantization of the second parameter.

According to embodiments of the method, the non-uniform step-sizes of the second scalar quantization scheme increase with the value of the second parameter.

According to embodiments of the method, the first scalar quantization scheme comprises more quantization steps than the second scalar quantization scheme.

According to embodiments of the method, the first scalar quantization scheme is constructed by offsetting, mirroring and concatenating the second scalar quantization scheme.

According to embodiments of the method, the largest step-size of the first and/or second scalar quantization scheme is approximately four times larger than the smallest step-size of the first and/or second scalar quantization scheme.

According to example embodiments, there is provided a computer-readable medium comprising computer code instructions adapted to carry out any method of the first aspect when executed on a device having processing capability.

According to example embodiments there is provided an audio encoder for quantization of parameters relating to parametric spatial coding of audio signals, comprising: a receiving component arranged to receive at least a first parameter and a second parameter to be quantized; a first quantizing component arranged downstreams of the receiving component configured to quantize the first parameter based on a first scalar quantization scheme having non-uniform step-sizes to obtain a quantized first parameter, wherein the non-uniform step-sizes are selected such that smaller step-sizes are used for ranges of the first parameter where the human sound perception is most sensitive, and larger step-sizes are used for ranges of the first parameter where the human sound perception is less sensitive; a dequantizing component configured to receive the first quantized parameter from the first quantizing component, and to dequantize the quantized first parameter using the first scalar quantization scheme to obtain a dequantized first parameter being an approximation of the first parameter; a scaling factor determining component configured to receive the dequantized first parameter, access a scaling function which maps values of the dequantized first parameter on scaling factors which increase with the step-sizes corresponding to the values of the dequantized first parameter, and determine a scaling factor by subjecting the dequantized first parameter to the scaling function; and a second quantizing component configured to receive the second parameter and the scaling factor, and quantize the second parameter based on the scaling factor and a second scalar quantization scheme having non-uniform step-sizes to obtain a quantized second parameter.

II. Overview—Decoder

According to a second aspect, example embodiments propose decoding methods, decoders, and computer program products for decoding. The proposed methods, decoders and computer program products may generally have the same features and advantages.

Advantages regarding features and setups as presented in the overview of the encoder above may generally be valid for the corresponding features and setups for the decoder.

According to example embodiments there is provided a method in an audio decoder for dequantization of quantized parameters relating to parametric spatial coding of audio signals, comprising: receiving at least a first quantized parameter and a second quantized parameter; dequantizing the quantized first parameter according to a first scalar quantization scheme having non-uniform step-sizes to obtain a dequantized first parameter, wherein the non-uniform step-sizes are selected such that smaller step-sizes are used for ranges of the first parameter where the human sound perception is most sensitive, and larger step-sizes are used for ranges of the first parameter where the human sound perception is less sensitive;

accessing a scaling function which maps values of the dequantized first parameter on scaling factors which increase with the step-sizes corresponding to the values of the dequantized first parameter, and determining a scaling factor by subjecting the dequantized first parameter to the scaling function; and dequantizing the second quantized parameter based on the scaling function and a second scalar quantization scheme having non-uniform step-sizes to obtain a dequantized second parameter.

According to example embodiments of the method, the scaling function is a piecewise linear function.

According to an embodiment, the step of dequantizing the second parameter based on the scaling factor and the second scalar quantization scheme comprises dequantizing the second quantized parameter in accordance with the second scalar quantization scheme and multiplying the result thereof by the scaling factor.

According to an alternative embodiment, the non-uniform step-sizes of the second scalar quantization scheme are scaled by the scaling factor prior to dequantization of the second quantized parameter.

According to further embodiments, the non-uniform step-size of the second scalar quantization scheme increases with the value of the second parameter.

According to an embodiment, the first scalar quantization scheme comprises more quantization steps than the second scalar quantization scheme.

According to an embodiment, the first scalar quantization scheme is constructed by offsetting, mirroring and concatenating the second scalar quantization scheme.

According to an embodiment, the largest step-size of the first and/or second scalar quantization scheme is approximately four times larger than the smallest step-size of the first and/or second scalar quantization scheme.

According to example embodiments, there is provided a computer-readable medium comprising computer code instructions adapted to carry out the method of any method of the second aspect when executed by a device having processing capability.

According to example embodiments, there is provided an audio decoder for dequantization of quantized parameters relating to parametric spatial coding of audio signals, comprising: a receiving component configured to receive at least a first quantized parameter and a second quantized parameter; a first dequantizing component arranged downstreams of the receiving component and configured to dequantize the quantized first parameter according to a first scalar quantization scheme having non-uniform step-sizes to obtain a dequantized first parameter, wherein the non-uniform step-sizes are selected such that smaller step-sizes are used for ranges of the first parameter where the human sound perception is most sensitive, and larger step-sizes are used for ranges of the first parameter where the human sound perception is less sensitive; a scaling factor determining component configured to receive the dequantized first parameter from the first dequantizing component, access a scaling function which maps values of the dequantized first parameter on scaling factors which increase with the step-sizes corresponding to the values of the dequantized first parameter, and determine a scaling factor by subjecting the dequantized first parameter to the scaling function; and a second dequantizing component configured to receive the scaling factor and the second quantized parameter, and dequantize the second quantized parameter based on the scaling factor and a second scalar quantization scheme having non-uniform step-sizes to obtain a dequantized second parameter.

According to example embodiments, there is provided methods, apparatus and systems for dequantization of quantized parameters relating to decoding of audio signals. At least a first quantized parameter and a second quantized parameter are received. The quantized first parameter is dequantized according to a first scalar quantization scheme having first non-uniform step-sizes to obtain a dequantized first parameter. The first non-uniform step-sizes are selected such that smaller step-sizes are used for ranges of the first parameter where the human sound perception is most sensitive, and larger step-sizes are used for ranges of the first parameter where the human sound perception is less sensitive. A scaling factor is determined based on the dequantized first parameter. The second quantized parameter is dequantized based on a second quantization scheme having second non-uniform step-sizes to obtain a dequantized second parameter. The second quantization scheme is one of a scalar quantization scheme or a vector quantization scheme.

III. Overview—an Audio Encoding/Decoding System

According to a third aspect, example embodiments propose decoding/encoding systems comprising an encoder according to the first aspect and a decoder according to the second aspect.

Advantages regarding features and setups as presented in the overview of the encoder and decoder above may generally be valid for the corresponding features and setups for the system.

According to example embodiments there is provided such a system wherein the audio encoder is arranged to transmit the first and second quantized parameters to the audio decoder.

IV. Example Embodiments

The disclosure herein discusses perceptually optimized quantization of parameters used in a system for parametric spatial coding of audio signals. In the examples considered below, the special case of parametric stereo coding for 2-channel signals is discussed. The same technique can also be used in parametric multichannel coding, e.g. in a system operating in 5-3-5 mode. An example embodiment of such a system is outlined in FIG. 7 and will be briefly discussed below. The example embodiments presented here relate to simple non-uniform quantization allowing reduction of the bit rate needed for convening these parameters without affecting the perceived audio quality, and further allowing continued use of established entropy coding techniques for scalar parameters (like time- or frequency-differential coding followed by Huffman coding).

FIG. 1 shows a block diagram of an embodiment of a parametric stereo encoding and decoding system 100 discussed here. A stereo signal comprising a left channel 101 (L) and a right channel 102 (R) is received by the encoder part 110 of the system 100. The stereo signal is sent as input to an "Advanced Coupling" (ACPL) encoder 112 generating a mono down mix 103 (M) and stereo parameters a (referred to in FIG. 1 as 104a) and b (referred to in FIG. 1 as 104b). Furthermore, the encoder part 110 comprises a downmix encoder 114 (DMX Enc) transforming the mono down mix 103 to a bit stream 105, a stereo parameter quantization means 116 (Q) generating a stream of quantized stereo parameters 106, and a multiplexer 118 (MUX) that generates the final bit stream 108 that also comprises the quantized stereo parameters that is conveyed to the decoder part 120. The decoder part 120 comprises a de-multiplexer 122 (DE-MUX) which receives the incoming final bit stream 108 and regenerates the bit stream 105 and the stream of quantized stereo parameters 106, a downmix decoder 124 (DMX Dec) which receives the bit stream 105 and outputs a decoded mono downmix 103' (M'), a stereo parameter dequantization means 126 (Q') which receives a stream of quantized stereo parameters 106 and outputs dequantized stereo parameters a' 104a' and b' 104b', and finally the ACPL decoder 128 that receives the decoded mono downmix 103' and the dequantized stereo parameters 104a', 104b' and transforms these incoming signals into reconstructed stereo signals 101' (L') and 102' (R').

Starting from incoming stereo signals 101 (L) and 102 (R) the ACPL encoder 112 computes a mono downmix 103 (M) and a side signal (S) according to following equations:

$$M=(L+R)/2 \qquad \text{(equation 1)}$$

$$S=(L-R)/2 \qquad \text{(equation 2)}$$

Stereo parameters a and b are computed in a time- and frequency-selective manner, i.e. for each time/frequency tile, typically with help of a filterbank like a QMF bank and using a non-uniform grouping of QMF bands to form a set of parameter bands according to a perceptual frequency scale.

In the ACPL decoder, the decoded mono downmix M' together with stereo parameters a', b' and a decorrelated version of M' (decorr(M')) are used as input to reconstruct an approximation of the side signal in accordance with the following equation:

$$S'=a'^*M'+b'^*\text{decorr}(M') \qquad \text{(equation 3)}$$

L' and R' are then computed as:

$$L'=M'+S' \qquad \text{(equation 4)}$$

$$R'=M'-S' \qquad \text{(equation 5)}$$

The parameter pair (a, b) can be considered as a point in a two-dimensional (a, b)-plane. The parameters a, b are related to the perceived stereo image, where parameter a is primarily related to the position of the perceived sound source (e.g. left or right), and where parameter b is primarily related to the size or width of the perceived sound source (small and well localized or wide and ambient). Table 1 lists a few typical examples of perceived stereo images and the corresponding values of the parameters a, b.

TABLE 1

| Point | Parameter values | Signal description |
|---|---|---|
| Left | a = 1, b = 0 | Signal fully panned to the left side, i.e. R = 0. |
| Center | a = 0, b = 0 | Signal in phantom center, i.e. L = R. |
| Right | a = −1, b = 0 | Signal fully panned to the right side, i.e. L = 0. |
| Wide | a = 0, b = 1 | Wide signal, L and R are uncorrelated and have same level. |

Note that b is never negative. It should also be noted that even though b and the absolute value of a often are within the range of 0 to 1, they can also have absolute values larger than 1, for example in case of strong out-of-phase components in L and R, i.e. when the correlation between L and R is negative.

Figure 5:
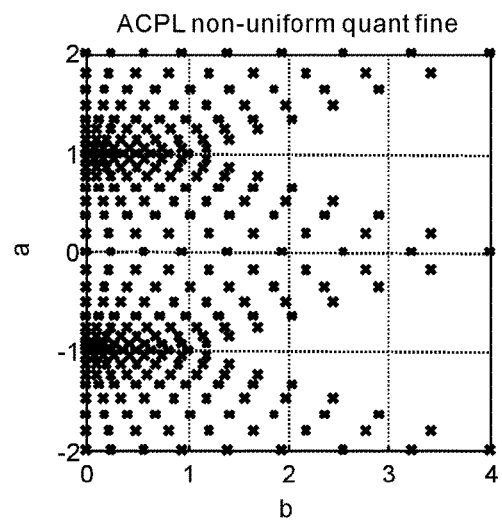
FIG. 5 discloses non-uniform and uniform quantizers (fine and coarse) in the (a, b)-plane, where a and b are stereo parameters.
Figure 5:
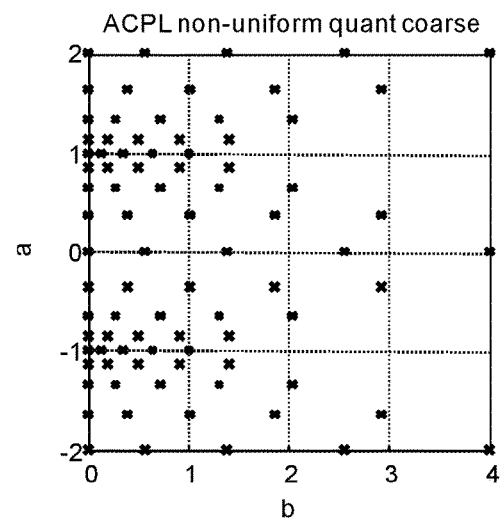
Figure 5:
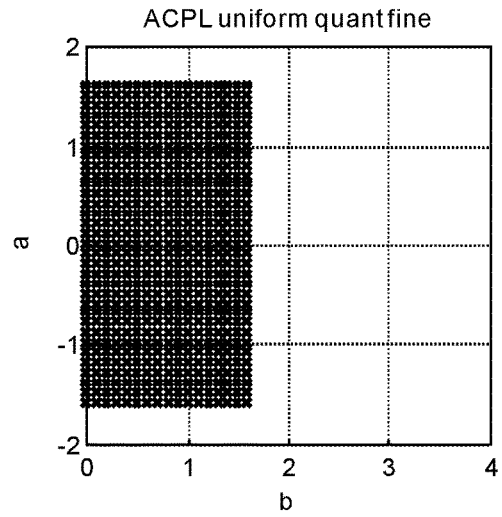
Figure 5:
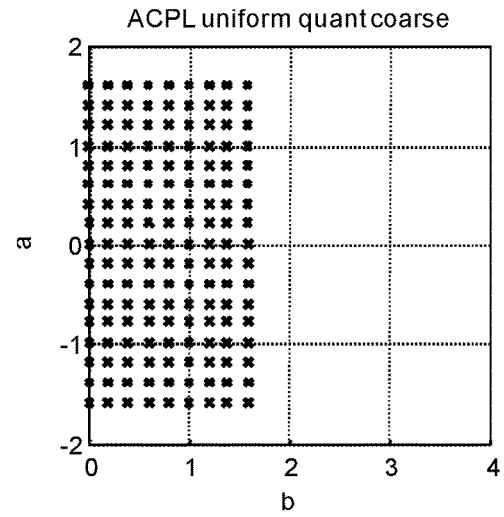

The problem at hand is now to design a technique to quantize parameters a, b for transmission as side information in a parametric stereo/spatial coding system. A simple and straight-forward approach of prior art is to use uniform quantization and quantize a and b independently, i.e. to use two scalar quantizers. A typical quantization step size is delta=0.1 for fine or delta=0.2 for coarse quantization. The bottom left and right panel of FIG. 5 show the points in the (a, b) plane that can be represented by such a quantization scheme for fine and coarse quantization. Typically, the quantized parameters a and b are entropy-coded independently, using time-differential or frequency-differential coding in combination with Huffman coding.

However, the present inventors have now realized that the performance (in a rate-distortion sense) of the parameter quantization can be improved over such scalar quantization by taking perceptual aspects into account. In particular, the sensitivity of the human auditory system to small changes in the parameter values (like the error introduced by quantization) depends on the position in the (a, b) plane. Perceptual experiments investigating the audibility of such small changes or "just-noticeable differences" (JND) indicate that JNDs for a and b are substantially smaller for sound sources with a perceived stereo image that is represented by the points (1, 0) and (−1, 0) in the (a, b)-plane. Hence, a uniform quantization of a and b can be too coarse (with audible artifacts) for the regions close to (1, 0) and (−1, 0) and unnecessary fine (causing an unnecessarily high side information bit rate) in other regions, such as around (0, 0) and (0, 1). It would of course be possible to consider a vector quantizer for (a, b) to achieve joint and non-uniform quantization of the stereo parameters a and b. However, a vector quantizer is computationally more complex, and also the entropy coding (time- or frequency-differential) would have to be adapted and would become more complex as well.

Accordingly, a novel non-uniform quantization scheme for the parameters a and b is introduced in this application. The non-uniform quantization scheme for a and b exploits position-dependent JNDs (like a vector quantizer could do) but it can be implemented as a small modification to the prior art uniform and independent quantization of a and b.

Furthermore, also the prior art time- or frequency-differential entropy coding can remain basically unchanged. Only Huffman code books need to be updated to reflect changes in index ranges and symbol probabilities.

Figure 2:
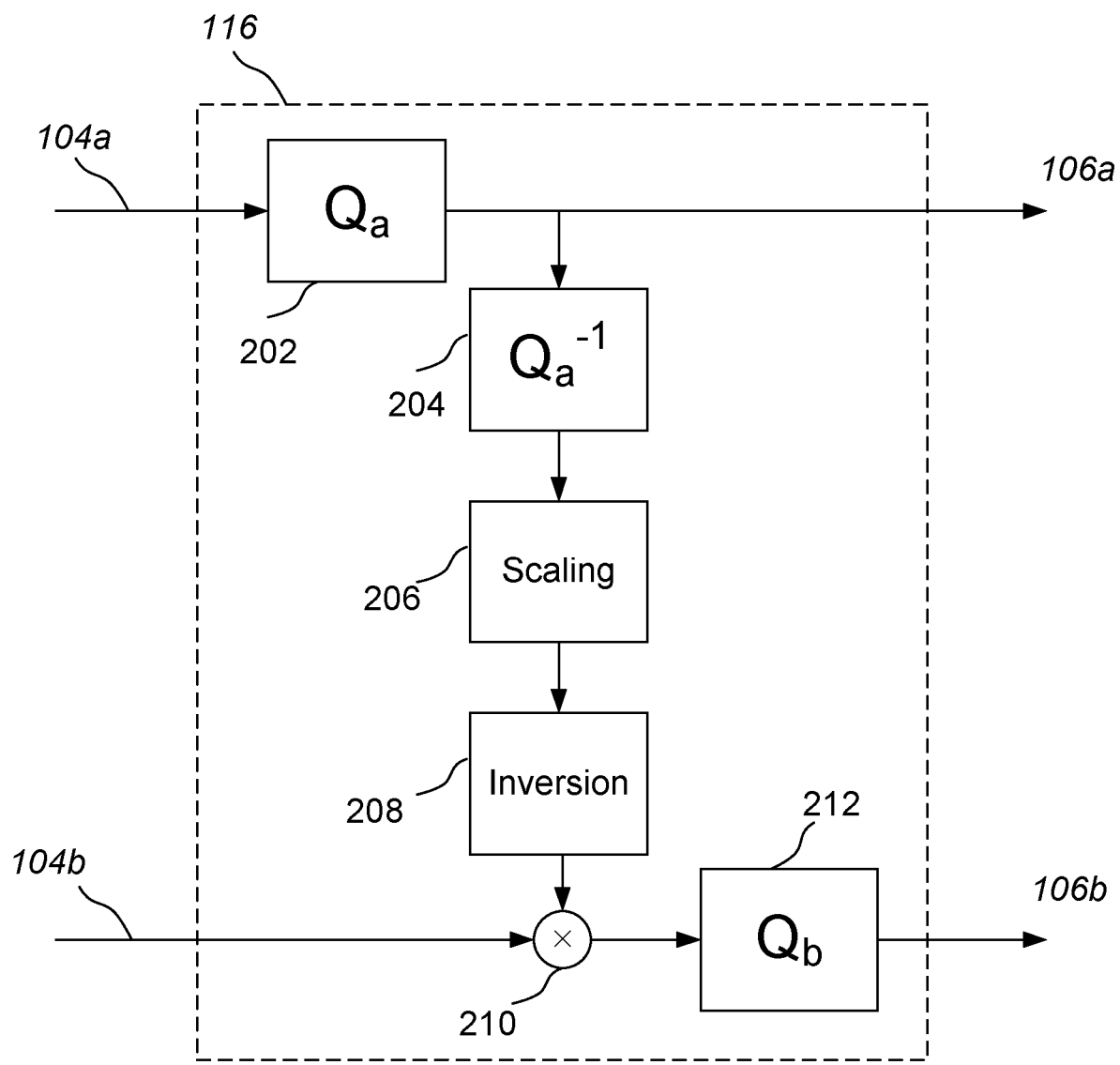
FIG. 2 shows a block diagram relating to processing of stereo parameters in encoding part of the parametric stereo encoding system of FIG. 1.
Figure 3:
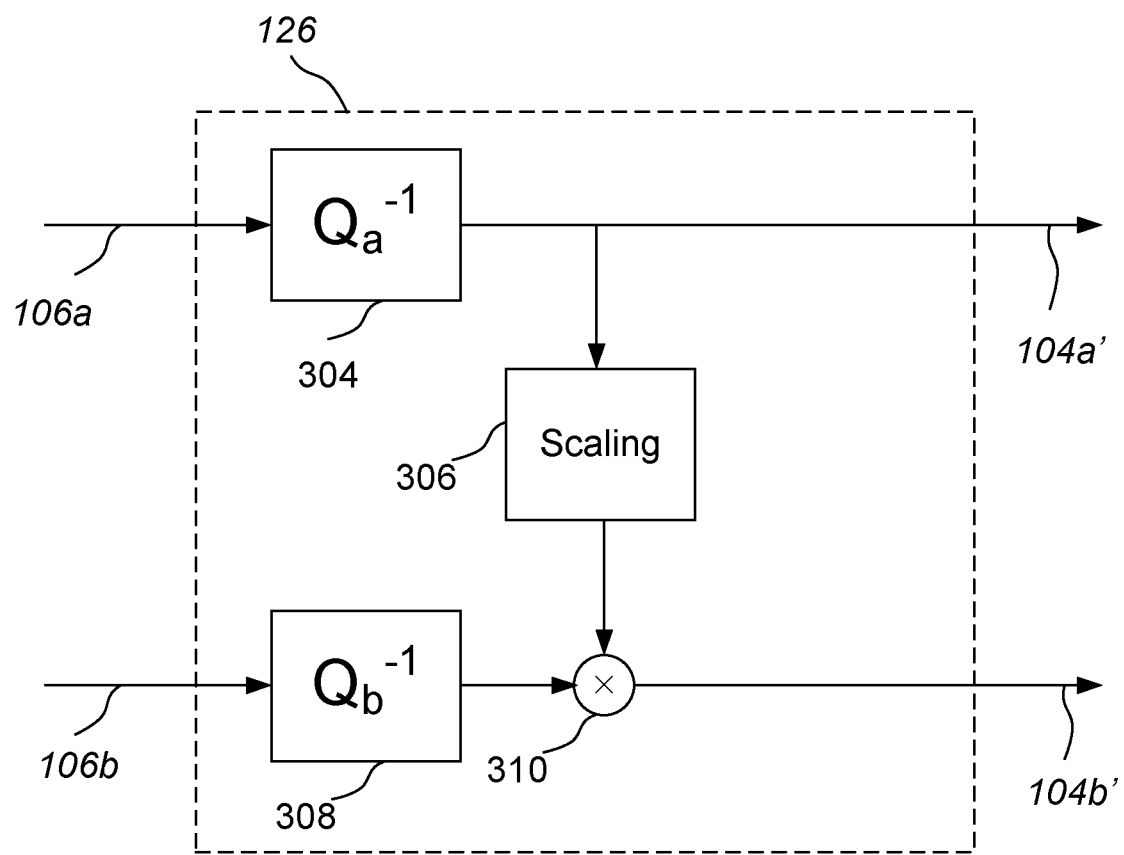
FIG. 3 presents a block diagram relating to processing of stereo parameters in the decoding part of the parametric stereo encoding system of FIG. 1.

The resulting quantization scheme is shown in FIGS. 2 and 3, where FIG. 2 relates to the stereo parameter quantization means 116 of the encoder part 110 and FIG. 3 relates to the stereo parameter dequantization means 126 of the decoder part 120. The stereo parameter quantization scheme starts by applying a non-uniform scalar quantization to parameter a (referred to as 104a in FIG. 2) in quantizing means $Q_a$ (referred to as 202 in FIG. 2). The quantized parameter 106a is forwarded to the multiplexer 118. The quantized parameter is also dequantized directly in dequantization means $Q_a^{-1}$ (referred to as 204 in FIG. 2) to parameter a'. As quantized parameter 106a is dequantized to a' (referred to as 104a' in FIG. 3) in the decoder part 120 too, a' will be identical in both the encoder part 110 and the decoder part 120 of the system 100. Then, a' is used to compute a scaling factors (carried out by scaling means 206) that is used to make the quantization of b dependent on the actual value of a. The parameter b (referred to as 104b in FIG. 2) is divided by this scaling factor s (carried out by inversion means 208 and multiplying means 210) and then sent to another non-uniform scalar quantizer $Q_b$ (referred to as 212 in FIG. 2) from which the quantized parameter 106b is forwarded. The process is partially reversed in stereo parameter dequantizing means 126 shown in FIG. 3. Incoming quantized parameters 106a and 106b are dequantized in dequantizing means $Q_a^{-1}$ (referred to in FIG. 3 as 304) and $Q_b^{-1}$ (referred to in FIG. 3 as 308) to a' (referred to 104a' in FIG. 3) and b' previously divided with scaling factor s in the encoder part 110. Scaling means 306 determines the scaling factor s based upon the dequantized parameter a' (104a) in the same way as scaling means 206 in the encoder part 110. The scaling factor is then multiplied with the result of the dequantization of quantized parameter 106b in multiplying means 310 and dequantized parameter b' (referred to as 104b' in FIG. 3) is obtained. Accordingly, the dequantization of a and the computation of the scaling factor is implemented in both the encoder part 110 and the decoder part 120, ensuring that exactly the same value of s is used for encoding and decoding of b.

The non-uniform quantization for a and b is based upon a simple non-uniform quantizer for values in the range of 0 to 1 where the quantization step size for values around 1 is approximately four times that of the quantization step size for values around 0, and where the quantization step size increases with the value of the parameter. For example, the quantization step size can increase approximately linearly with the index identifying the corresponding dequantized value. For a quantizer with 8 intervals (i.e. 9 indicies), the following values can be obtained, where the quantization step size is the difference between two neighboring dequantized values.

TABLE 2

Dequantized values within the range of 0 to 1

| Index | Value |
|---|---|
| 0 | 0 |
| 1 | 0.0594 |
| 2 | 0.1375 |
| 3 | 0.2344 |
| 4 | 0.3500 |
| 5 | 0.4844 |

TABLE 2-continued

Dequantized values within the range of 0 to 1

| Index | Value |
|---|---|
| 6 | 0.6375 |
| 7 | 0.8094 |
| 8 | 1.0000 |

This table is an example of a quantization scheme that could be used for dequantizing means $Q_b^{-1}$ (referred to as 308 in FIG. 3). However, a larger range of values must be handled for parameter a. An example of a quantization scheme for dequantizing means $Q_a^{-1}$ (referred to as 304 in FIG. 3) could simply be constructed by mirroring and concatenating the non-uniform quantization intervals shown in table 2 above to give a quantizer that can represent values in the range of −2 to 2, where the quantization step size for values around −2, 0, and 2 is approximately four times that of the quantization step size for values around −1 and 1. The resulting values are shown in table 3 below.

TABLE 3

Dequantized values within the range of −2 to 2

| Index | Value |
|---|---|
| 0 | −2.000 |
| 1 | −1.8094 |
| 2 | −1.6375 |
| 3 | −1.4844 |
| 4 | −1.3500 |
| 5 | −1.2344 |
| 6 | −1.1375 |
| 7 | −1.0594 |
| 8 | −1.000 |
| 9 | −0.9406 |
| 10 | −0.8625 |
| 11 | −0.7656 |
| 12 | −0.6500 |
| 13 | −0.5156 |
| 14 | −0.3625 |
| 15 | −0.1906 |
| 16 | 0 |
| 17 | 0.1906 |
| 18 | 0.3625 |
| 19 | 0.5156 |
| 20 | 0.6500 |
| 21 | 0.7656 |
| 22 | 0.8625 |
| 23 | 0.9406 |
| 24 | 1.000 |
| 25 | 1.0594 |
| 26 | 1.1375 |
| 27 | 1.2344 |
| 28 | 1.3500 |
| 29 | 1.4844 |
| 30 | 1.6375 |
| 31 | 1.8094 |
| 32 | 2.000 |

Figure 4:
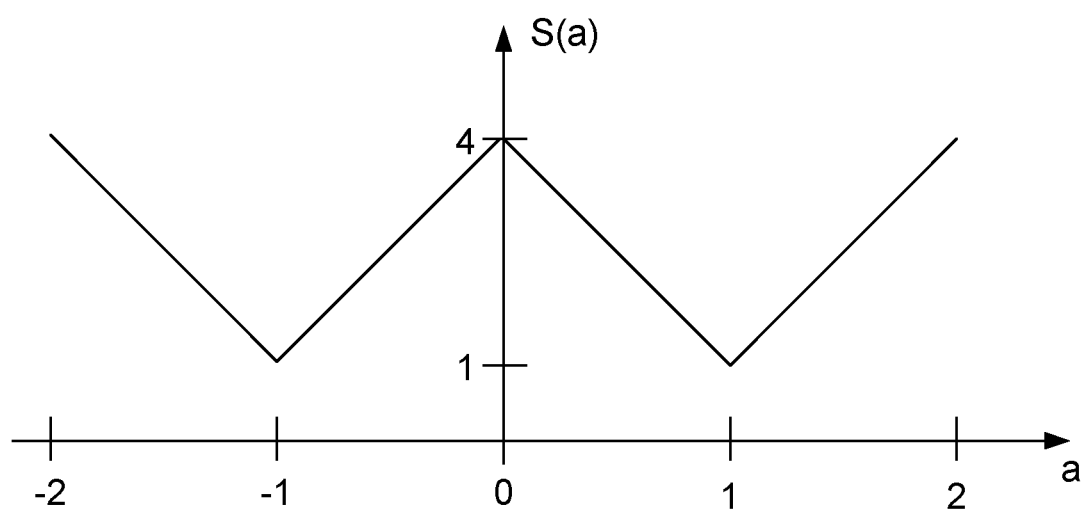
FIG. 4 shows the value of a scaling factor s as a function of one of the stereo parameters.

FIG. 4 shows the value of the scaling factor s as a function of a. It is a piecewise linear function, with s=1 (i.e. no scaling) for a=−1 and a=1 and s=4 (4 times coarser quantization of b) for a=−2, a=0 and a=2. It is pointed out that the function of FIG. 4 is an example and that other such functions are theoretically possible. The same reasoning is applicable to the quantization schemes.

The resulting non-uniform quantization of a and b is shown in the top left panel of FIG. 5, where each point in the (a, b) plane that can be represented by this quantizer is marked by a cross. Around the most sensitive points (1, 0) and (−1, 0), the quantization step size for both a and b is approximately 0.06, while it is approximately 0.2 for a and b around (0, 0). Hence, the quantization steps are much more adapted to the JNDs than those of a uniform scalar quantization of a and b.

If coarser quantization would be desired, it is possible to simply drop every second dequantized value of the non-uniform quantizers, thereby doubling the quantization step sizes. Table 4 shows the following coarse non-uniform quantizers for parameter b and the non-uniform quantizers for parameter a are obtained analogous to what has been shown above.

TABLE 4

Dequantized values for coarser quantization within the range of 0 to 1:

| Index | Value |
|---|---|
| 0 | 0 |
| 1 | 0.1375 |
| 2 | 0.3500 |
| 3 | 0.6375 |
| 4 | 1.000 |

The scaling function shown in FIG. 4 remains unchanged for coarse quantization, and the resulting coarse quantizer for (a, b) is shown in the top right panel of FIG. 5. Such coarse quantization can be desirable if the coding system is operated at very low target bit rates, where it can be advantageous to spend the bits saved by coarser quantization of the stereo parameters on coding the mono downmix signal M (referred to as 103 in FIG. 1) instead.

Figure 6:
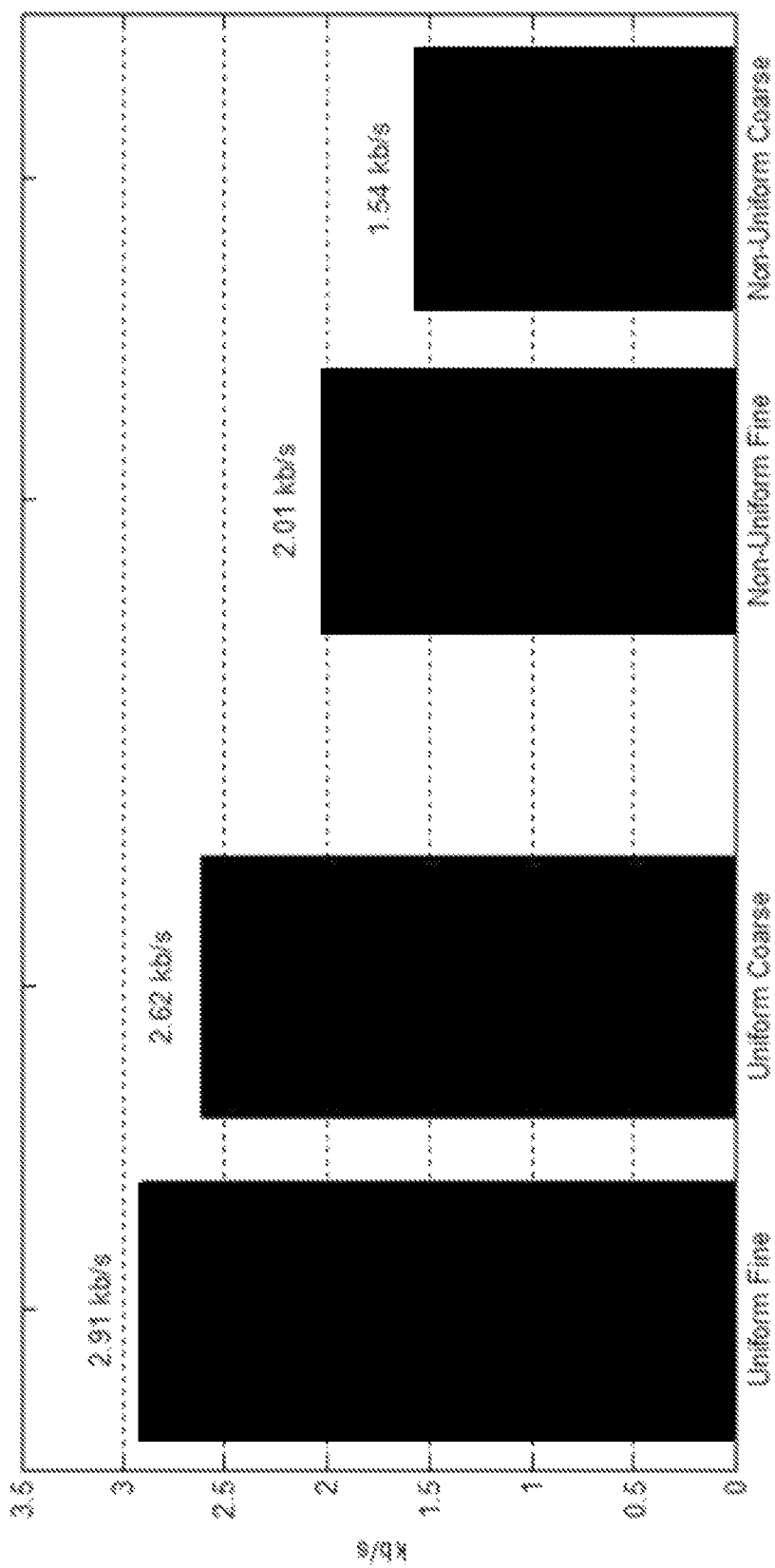
FIG. 6 presents a diagram showing average parametric stereo bit consumption for examples of uniform fine, and uniform coarse quantization, compared with non-uniform fine and non-uniform coarse quantization in accordance with an example embodiment.

The difference in efficiency between a non-uniform and a uniform quantization of the stereo parameters a and b is demonstrated in FIG. 6. The differences are shown for a fine and a coarse quantization. The average bit consumption per second corresponding to 11 hours of music is shown. It can be concluded from the figure that the bit consumption for non-uniform quantization is substantially lower than for uniform quantization. Furthermore, it can be concluded that coarser non-uniform quantization reduces bit consumption per second more than coarser uniform quantization does.

Figure 7:
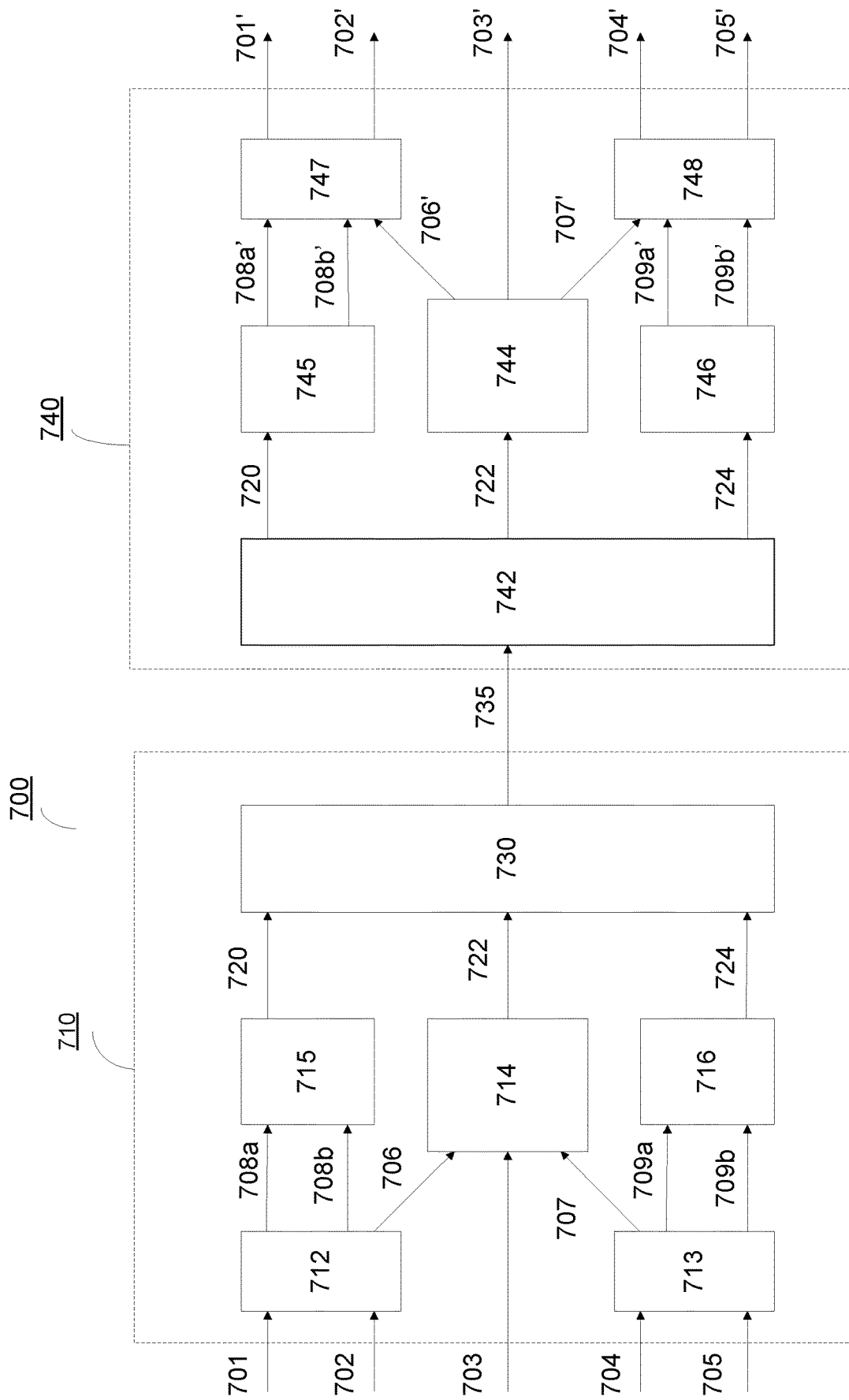
FIG. 7 discloses a block diagram of a parametric multi-channel encoding and decoding system in accordance with another example embodiment.

Finally, a block diagram an example embodiment of a 5-3-5 parametric multichannel encoding and decoding system 700 is disclosed in FIG. 7. A multichannel signal comprising a left front channel 701, a left surround channel 702, a center front channel 703, a right front channel 704 and a right surround channel 705 is received by the encoder part 710 of the system 700. The signals of left front channel 701 and the left surround channel 702 are sent as input to a first "Advanced coupling" (ACPL) encoder 712 generating a left down mix 706 and stereo parameters $a_L$ (referred to as 708a) and $b_L$ (referred to as 708b). Similarly, the signals of right front channel 704 and the right surround channel 705 are sent as input to a second "Advanced coupling" (ACPL) encoder 713 generating a right down mix 707 and stereo parameters $a_R$ (referred to as 709a) and $b_R$ (referred to as 709b). Furthermore, the encoder part 710 comprises a 3-channel downmix encoder 714 transforming the signals of left downmix 706, the center front channel 703 and the right downmix 707 to a bit stream 722, a first stereo parameter quantization means 715 generating a first stream of quantized stereo parameters 720 based stereo parameters 708a and 708b, a second stereo parameter quantization means 716 generating a second stream of quantized stereo parameters 724 based on stereo parameters 709a and 709b, and a multiplexer 730 that generates the final bit stream 735 that also comprises the quantized stereo parameters that is conveyed to the decoder part 740. The decoder part 740 comprises a de-multiplexer 742 which receives the incoming final bit stream 735 and regenerates the bit stream 722, the first stream of quantized stereo parameters 720 and the second stream of quantized stereo parameters 724. The first stream of quantized stereo parameters 720 is received by a first stereo parameter dequantization means 745 which outputs dequantized stereo parameters 708*a*' and 708 *b*'. The second stream of quantized stereo parameters 724 is received by second stereo parameter dequantization means 746 which outputs dequantized stereo parameters 709*a*' and 709*b*'. The bit stream 722 is received by 3-channel downmix decoder 744 which outputs regenerated left down mix 706', reconstructed center front channel 703' and regenerated right downmix 707'. A first ACPL decoder 747 receives dequantized stereo parameters 708*a*' and 708*b*' as well as regenerated left downmix 706' and outputs reconstructed left front channel 701', and reconstructed left surround channel 702'. Similarly, a second ACPL decoder 748 receives dequantized stereo parameters 709*a*', 709*b*', and regenerated right downmix 707' and outputs reconstructed right front channel 704' and reconstructed right surround channel 705'.

Equivalents, Extension, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The systems and methods disclosed herein above may be implemented as software, firmware, hardware, or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer-readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic disk storage devices, or any other medium which can be used to store the desired information and which can be accessed by a computer. Further, it is well-known to the skilled person that communication media typically embodies computer-readable instructions, data structures, program modules or other data in a modulated data signal such as a carrier wave or other transport mechanism and includes any information delivery media.

The invention claimed is:

1. A method in an audio decoder for dequantization of quantized parameters relating to parametric spatial coding of audio signals, comprising:
   receiving at least a first quantized parameter and a second quantized parameter;
   dequantizing the quantized first parameter according to a first scalar quantization scheme having non-uniform step-sizes to obtain a dequantized first parameter, wherein the non-uniform step-sizes are selected;
   accessing a scaling function which maps at least a value of the dequantized first parameter on scaling factors which increase with the step-sizes corresponding to the values of the dequantized first parameter, and determining a scaling factor by subjecting the dequantized first parameter to the scaling function; and
   dequantizing the second quantized parameter based on the scaling factor and a second scalar quantization scheme having non-uniform step-sizes to obtain a dequantized second parameter.

2. The method of claim 1, wherein the scaling function is a piecewise linear function.

3. The method of claim 1 wherein the step of dequantizing the second parameter based on the scaling factor and the second scalar quantization scheme comprises dequantizing the second quantized parameter in accordance with the second scalar quantization scheme and multiplying the result thereof by the scaling factor.

4. The method of claim 1, wherein the non-uniform step-sizes of the second scalar quantization scheme:
   are scaled by the scaling factor prior to dequantization of the second quantized parameter; and/or
   increases with the value of the second parameter.

5. The method of claim 1, wherein the first scalar quantization scheme:
   comprises more quantization steps than the second scalar quantization scheme; and/or
   is constructed by offsetting, mirroring, and concatenating the second scalar quantization scheme.

6. The method of claim 1, wherein the largest step-size of the first and/or second scalar quantization scheme is approximately four times larger than the smallest step-size of the first and/or second scalar quantization scheme.

7. An audio decoder for dequantization of quantized parameters relating to parametric spatial coding of audio signals, comprising:
   a receiving component configured to receive at least a first quantized parameter and a second quantized parameter;
   a first dequantizing component arranged downstreams of the receiving component and configured to dequantize the quantized first parameter according to a first scalar quantization scheme having non-uniform step-sizes to obtain a dequantized first parameter;
   a scaling factor determining component configured to receive the dequantized first parameter from the first dequantizing component, access a scaling function which maps values of the dequantized first parameter on scaling factors which increase with the step-sizes corresponding to the values of the dequantized first parameter, and determine a scaling factor by subjecting the dequantized first parameter to the scaling function; and a second dequantizing component configured to receive the scaling factor and the second quantized parameter, and dequantize the second quantized parameter based on the scaling factor and a second scalar quantization scheme having non-uniform step-sizes to obtain a dequantized second parameter.

* * * * *